(12) United States Patent
Ng et al.

(10) Patent No.: US 11,277,207 B1
(45) Date of Patent: Mar. 15, 2022

(54) APPARATUS AND METHOD FOR IN-PHASE AND QUADRATURE SKEW CALIBRATION IN A COHERENT TRANSCEIVER

(71) Applicants: Wing Chau Ng, Stittsville (CA); Xuefeng Tang, Kanata (CA); Zhuhong Zhang, Ottawa (CA)

(72) Inventors: Wing Chau Ng, Stittsville (CA); Xuefeng Tang, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 17/008,402

(22) Filed: Aug. 31, 2020

(51) Int. Cl.
   *H04L 25/03* (2006.01)
   *H04B 10/61* (2013.01)
   *H04B 7/0413* (2017.01)

(52) U.S. Cl.
   CPC ....... *H04B 10/6165* (2013.01); *H04B 7/0413* (2013.01); *H04B 10/613* (2013.01); *H04L 25/03885* (2013.01)

(58) Field of Classification Search
   CPC .............. H04B 10/6165; H04B 10/613; H04B 7/0413; H04L 25/03885
   USPC ....................................................... 398/202
   See application file for complete search history.

(56) References Cited

U.S. PATENT DOCUMENTS 9,847,841 B1    12/2017  Kaneda
10,038,498 B1 *  7/2018  Fan ................... H04B 10/5053
2013/0243420 A1 *  9/2013  Li ..................... H04B 10/6162
                                                              398/25
2018/0159652 A1 *  6/2018  Calabro ............ H04B 10/6165
2019/0342028 A1 * 11/2019  He ..................... H04B 10/612
2020/0266901 A1    8/2020  Fan et al.

FOREIGN PATENT DOCUMENTS

CN           106330320 A        1/2017

OTHER PUBLICATIONS

Y. Yue et al., "IQ Skew Monitoring and Alignment of Optical Quadrature Amplitude Transmitter using Reconfigurable Interference," Proc. CLEO, paper SW3I6 (2014).

(Continued)

*Primary Examiner* — Ted M Wang (57) ABSTRACT

Methods and apparatuses for IQ time skew calibration in a coherent transceiver are described. A four-channel signal is received. A set of inputs is constructed for a 4×8 MIMO equalizer by converting the four-channel signal into four complex inputs that each have a phase shift corresponding to an estimated carrier frequency offset. The set of inputs further includes conjugate replicas of the four complex inputs. Using output from the 4×8 MIMO equalizer, equalizer coefficients are calculated by minimizing error between the MIMO output and a reference signal. Receiver and transmitter IQ skew are estimated using the equalizer coefficients, by converting the equalizer coefficients form the time domain to the frequency domain to determine receiver and transmitter IQ differential phase responses, which are indicative of respective receiver and transmitter IQ skew in the time domain. Skew compensation is then performed.

19 Claims, 6 Drawing Sheets

(56) References Cited

OTHER PUBLICATIONS

C.R.S. Fludger, "Low Cost Transmitter Self-Calibration of Time Delay and Frequency Response for High Baud-Rate QAM Transceivers," Th1D.3, OFC 2017.
J. C. M. Diniz et al., "Time Skew Estimator for Dual-Polarization QAM transmitters," European Conference on Optical Communication (ECOC) 2017.
H. Chen et al., "In-phase/Quadrature Skew Measurement for Optical Mach-Zehnder Modulator," International Conference on Numerical Simulation of Optoelectronic Devices (2017).
Skvortcov, P., Sanchez-Costa, C., Phillips, I., et al.: 'Joint Tx and Rx skew calibration in coherent transceivers based on Rx-side DSP', Proc. IPC, Reston, USA, Oct. 2018, pp. 1-2.
P. Skvortcov et al., "Transmitter IQ skew calibration in coherent transceivers based on DSP",Advanced Photonics Congress, SpW1G. 6, 2018.
Y. Fan et al., "Experimental Verification of IQ Imbalance Monitor for High-order Modulated Transceivers," European Conference on Optical Communication (ECOC) 2018.
J. Liang et al., "Transceiver Imbalances Compensation and Monitoring by Receiver DSP," in Journal of lighwave technologies, 2019.

\* cited by examiner

APPARATUS AND METHOD FOR IN-PHASE AND QUADRATURE SKEW CALIBRATION IN A COHERENT TRANSCEIVER

RELATED APPLICATIONS

This is the first patent application for the present disclosure.

FIELD

The present disclosure is related to methods and devices for optical transmission, and in particular to methods and devices for calibrating for IQ time skew in a coherent transceiver.

BACKGROUND

Coherent optical transceivers (also called coherent transceivers) are used to transmit and receive optical signals by modulating the amplitude and phase of light transmitted through an optical channel, such as a fiber optic cable. For example, data may be encoded using quadrature amplitude modulation (QAM), and the transmission capacity may be doubled using polarization multiplexing (PM). One technique for coherent transmission involves using two separate electrical data channels—an in-phase (I) data channel and a quadrature (Q) data channel—to modulate the I and Q phase components of the optical signal. In a polarization-multiplexing IQ modulator, I and Q channels are used to modulate signals in each of two orthogonal polarizations: an I channel for an X-polarized signal (typically indicated as XI), an I channel for a Y-polarized signal (typically indicated as YI), a Q channel for the X-polarized signal (typically indicated as XQ), and a Q channel for the Y-polarized signal (typically indicated as YQ).

Time misalignment (also referred to as skew) between the I and Q data channels of the IQ modulators at the transmitter and the receiver (also referred to as IQ skew) is an impairment that may degrade the performance of the coherent transceiver, especially for high-order modulation formats at high symbol rates. IQ skew causes sampling error at the receiver, which cannot be compensated by a conventional 2×2 multiple-input multiple-output (MIMO) equalizer in the receiver digital signal processor (DSP). This sampling error can result in significant degradation in the signal-to-noise ratio (SNR). Moreover, an IQ skew that is larger than half the symbol duration may cause acquisition failure in the receiver DSP, because the error may be beyond the capacity of the 2×2 MIMO equalizer.

IQ skew can be compensated to some extent using an additional IQ equalization following a conventional 2×2 MIMO equalization. However, equalization performance may be degraded by channel impairments such as polarization mode dispersion (PMD), polarization dependent loss (PDL), and amplified spontaneous emission (ASE) noise.

Some optical receivers may include digital signal processors (DSP), also called DSP units, that are designed to measure the IQ skew during factory calibration or transceiver self-calibration. Existing approaches estimate the IQ skew at the receiver and then estimate the IQ skew at the transmitter, however the estimation IQ skew at the receiver is affected by the presence of IQ skew at the transmitter.

Accordingly, it would be useful to provide methods and apparatus for more accurate calibration of IQ skew, for both IQ skew at the receiver and IQ skew at the transmitter.

SUMMARY

In various examples described herein, methods and apparatus are disclosed that provide factory calibration, or self-calibration of in-phase (I) and quadrature (Q) time skew (also referred to as IQ skew) in a coherent transceiver. A receiver-side DSP approach is described, which enables calibration of IQ skew at the transmitter and the receiver jointly, without the need for additional hardware.

The disclosed examples use a one-stage 4×8 MIMO equalizer to jointly estimate transmitter and receiver IQ skew. The transmitter impairment does not affect estimation of the receiver skew, and vice versa. The 4×8 MIMO equalizer can directly compensate for the estimated transmitter and receiver skew.

Additionally, other impairments, such as XY skew can be estimated and compensated.

In some examples, the present disclosure describes an apparatus a receiver including a processor that is configured to: receive a measured signal, the measured signal being a four-channel signal corresponding to in-phase (I) and quadrature (Q) channels for each of two orthogonal polarizations; estimate a carrier frequency offset between the measured signal and a reference signal; construct a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs; using MIMO output from the 4×8 MIMO equalizer, calculate a set of equalizer coefficients by minimizing error between the MIMO output and the reference signal; estimate receiver IQ skew and transmitter IQ skew using the equalizer coefficients, by converting the set of equalizer coefficients from the time domain to the frequency domain to determine receiver IQ differential phase response and transmitter IQ differential phase response in the frequency domain, the receiver and transmitter IQ differential phase response being indicative of respective receiver and transmitter IQ skew in a time domain; and perform skew compensation using the estimated receiver IQ skew and estimated transmitter IQ skew.

In some examples, the present disclosure describes a method including: receiving a measured signal, the measured signal being a four-channel signal corresponding to in-phase (I) and quadrature (Q) channels for each of two orthogonal polarizations; estimating a carrier frequency offset between the measured signal and a reference signal; constructing a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs; using MIMO output from the 4×8 MIMO equalizer, calculating a set of equalizer coefficients by minimizing error between the MIMO output and the reference signal; estimating receiver IQ skew and transmitter IQ skew using the equalizer coefficients, by converting the set of equalizer coefficients from the time domain to the frequency domain to determine receiver IQ differential phase response and transmitter IQ differential phase response in the frequency domain, the receiver and transmitter IQ differential phase response being indicative of respective receiver and transmitter IQ skew in a time domain; and performing skew compensation using the estimated receiver IQ skew and estimated transmitter IQ skew.

In some examples, the present disclosure describes a computer-readable medium having instructions thereon. The instructions, when executed by a processor of a receiver, cause the receiver to: receive a measured signal, the measured signal being a four-channel signal corresponding to in-phase (I) and quadrature (Q) channels for each of two orthogonal polarizations; estimate a carrier frequency offset between the measured signal and a reference signal; construct a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs; using MIMO output from the 4×8 MIMO equalizer, calculate a set of equalizer coefficients by minimizing error between the MIMO output and the reference signal; estimate receiver IQ skew and transmitter IQ skew using the equalizer coefficients, by converting the set of equalizer coefficients from the time domain to the frequency domain to determine receiver IQ differential phase response and transmitter IQ differential phase response in the frequency domain, the receiver and transmitter IQ differential phase response being indicative of respective receiver and transmitter IQ skew in a time domain; and perform skew compensation using the estimated receiver IQ skew and estimated transmitter IQ skew.

In any of the examples, the set of equalizer coefficients may be calculated using a least squares algorithm to minimize the error between the MIMO output and the reference signal.

In any of the examples, the set of equalizer coefficients may be calculated using an adaptive least mean square algorithm to minimize the error between the MIMO output and the reference signal.

In any of the examples, the set of inputs may be constructed by: multiplying the Q-channel signals of the four-channel signal by imaginary number j, to obtain imaginary-valued Q-channel signals; pointwise multiplying each of real-valued I-channel signals and the imaginary-valued Q-channel signals with a carrier frequency offset phasor generated using the estimated carrier frequency offset, to obtain the four complex inputs; and applying a conjugate operation to each of the four complex inputs to obtain the respective conjugate replicas.

In any of the examples, the receiver IQ skew and the transmitter IQ skew may be estimated by: converting the equalizer coefficients from the time domain to the frequency domain; determining the receiver IQ differential phase response and the transmitter IQ differential phase response for each polarization; and using a slope of the respective differential phase response as the estimated receiver IQ skew and the estimated transmitter IQ skew for each polarization.

In any of the examples, the set of equalizer coefficients may be further used to estimate receiver XY skew and transmitter XY skew; and the estimated receiver XY skew and the estimated transmitter XY skew may be further used to perform skew compensation.

In any of the examples, the receiver XY skew and the transmitter XY skew may be estimated by: converting the equalizer coefficients from the time domain to the frequency domain; determining the receiver XY phase difference and the transmitter XY phase difference; and using a slope of the respective phase difference as the estimated receiver XY skew and the estimated transmitter XY skew.

In any of the examples, performing skew compensation may include: transmitting the estimated transmitter IQ skew to another apparatus.

In any of the examples, performing skew compensation may include real-time equalization using the 4×8 MIMO equalizer.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described for calibration of in-phase and quadrature (IQ) time skew in a coherent transceiver. To assist in understanding the present disclosure, FIG. 1 is first described.

Figure 1:
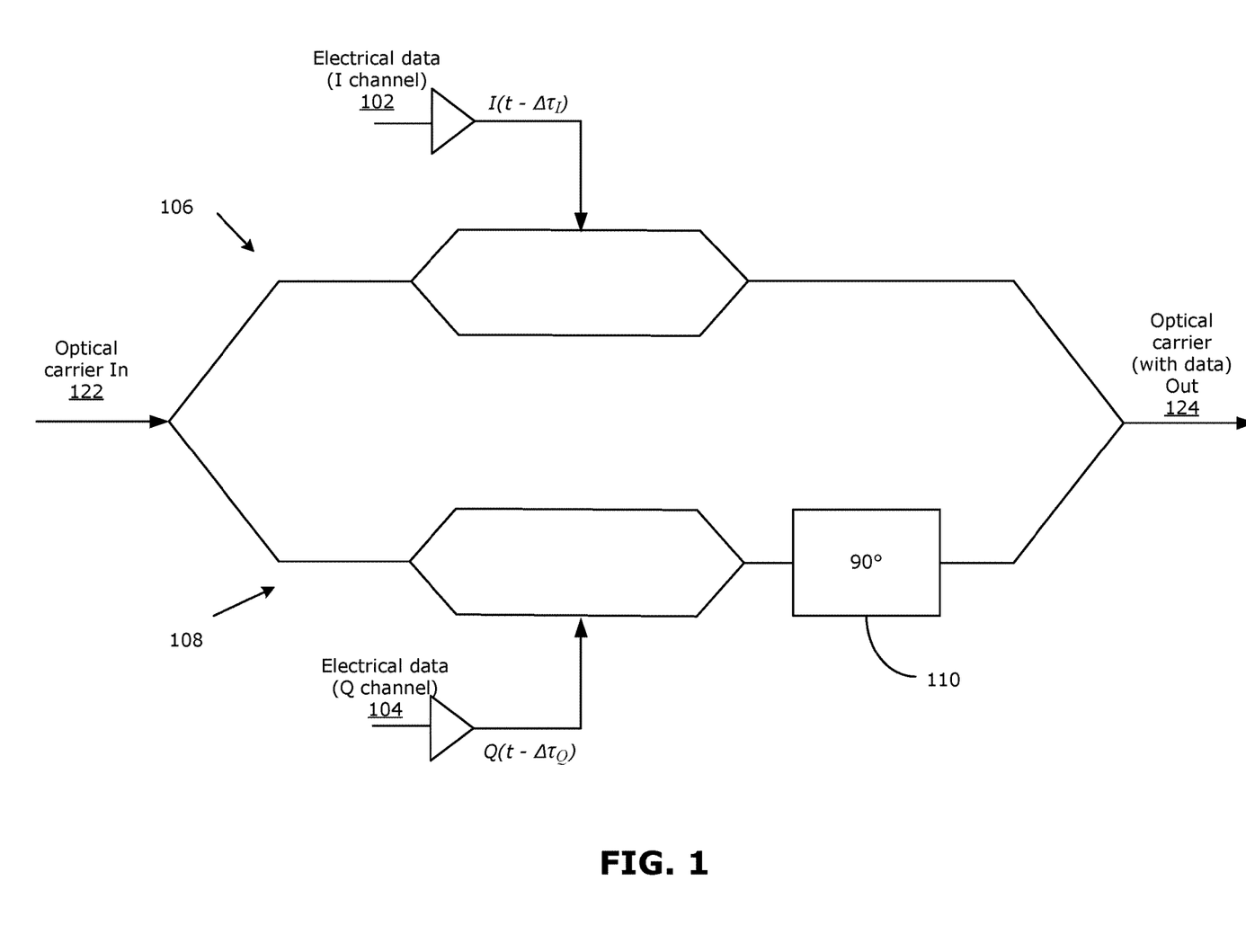
FIG. 1 is a schematic of an example in-phase and quadrature modulation.

FIG. 1 is a schematic illustrating an example of IQ modulation, which may be performed using an electro-optical modulator (EOM), such as a IQ Mach-Zehnder Modulator (IQ-MZM), or other suitable optical modulator. An in-phase (I) channel path 106 is modulated by an analog electrical data I channel 102 and a quadrature (Q) channel path 108 is modulated by an analog electrical data Q channel 104.

An optical carrier input 122 is received, for example in the form of a laser providing a light source at a particular frequency (e.g., about 193 THz). The optical carrier input 122 is split into the I channel path 106 and Q channel path 108 in accordance with optical interferometry techniques. The I path 106 receives an analog electrical signal from the I channel 102, which modulates an I component of the optical carrier signal propagated through the I channel path 106. The Q path 108 receives an analog electrical signal from the Q channel 104, which modulates a Q component of the optical carrier signal propagated through the Q channel path 108. The Q path 108 passes through a phase shifter 110 of about 90°. The optical signal output of the I path 106 and the optical signal output of the Q path 108 are coupled or combined to form an optical signal output 124 (which is the optical carrier modulated with the data). The signal at the output 124 is an optical quadrature amplitude modulation (QAM) signal, where the descriptor "optical" indicates that the QAM signal is carried by an optical carrier. Because there are two polarizations (X- and Y-polarizations), the signal at the output 124 may also be referred to as a dual-polarization optical signal.

The IQ skew is a relative delay between the data path of the I channel 102 and the data path of the Q channel 104, which may be defined as:

$$\Delta\tau_{IQ} = \Delta\tau_Q - \Delta\tau_I$$

where $\Delta\tau_{IQ}$ is the time skew, $\Delta\tau_Q$ is the time delay of the I data path, and $\Delta\tau_I$ is the time delay of the Q data path. The IQ skew is caused by a physical time delay difference between the I channel 102 and Q channel 104. The time delay in these channels 102, 104 may be caused by imperfections in the physical components, which may include, for example, a digital-to-analog converter (DAC) used to generate the analog channels from digital inputs, a driver used to drive the EOM, the EOM itself, and/or the printed circuit board (PCB) wires used by the transmitter.

At the receiver side (not shown in FIG. 1), the received optical signal is converted into an electrical signal by an optical coherent receiver, in order to recover the data on the I channel and on the Q channel. A digital coherent receiver may be implemented in the receiver. A digital coherent receiver includes an integrated coherent receiver (ICR), analog-to-digital converters (ADCs) and a digital signal processor (DSP) implementing equalization algorithms. Similar to the transmitter, time skew is introduced between the I and Q channels, because of component imperfections. In the present disclosure, IQ skew that is introduced at the transmitter is referred to as transmitter IQ skew, and IQ skew that is introduced at the receiver is referred to a receiver IQ skew.

A time difference between I and Q channels corresponds to a linear phase shift in frequency between the I and Q responses in the frequency domain. A time skew thus translates to a linear differential phase (in frequency domain) response between I and Q. This linear differential phase response can be clearly observed at lower frequencies (e.g., up to 15 GHz). Generally, this differential phase response is not linear in the higher frequency region, which results in significant distortion of high Baud signals. For some high speed systems, a time skew on the order of picoseconds may be a significant problem. In examples disclosed herein, methods and apparatuses are described that enable joint measurement of both transmitter and receiver IQ differential phase responses.

In some examples, the optical signal may be a dual-polarized optical signal. Four separate electrical data channels are used to modulate four modulation components of the optical signal, where the four orthogonal channels are the X-polarized I channel, X-polarized Q channel, Y-polarized I channel, and Y-polarized Q channel. That is, data is modulated on the I and Q components of each of two orthogonal polarization directions (X and Y) of the optical signal. This technique may be referred to as polarization-multiplexing optical modulation. At the receiver, the optical signal is converted back to an electrical signal using an optical coherent receiver, and separated into four separate channels from which the data is recovered. Typically, a 2×2 multiple-input multiple-output (MIMO) equalizer is implemented by the DSP at the receiver, to compensate for any channel impairments. Each polarization has respective IQ skew, such that there is receiver X-polarization IQ skew, receiver Y-polarization IQ skew, transmitter X-polarization IQ skew and transmitter Y-polarization IQ skew.

Conventionally, the 2×2 MIMO equalizer separates the X- and Y-polarized signals from each other. However, IQ skew causes sampling error at the receiver which cannot be compensated by a typical conventional 2×2 MIMO equalizer in the receiver DSP. This sampling error results in a significant degradation in the signal-to-noise ratio (SNR). As well, an IQ skew that is larger than half the symbol duration may cause acquisition failure in the receiver DSP. Previous attempts have been made to calibrate and pre-compensate for the IQ skew during factory calibration.

Some existing calibration solutions are hardware-based. Hardware-based solutions typically require additional electronic components and/or a change in the bias points IQ phase. This may be more difficult to implement due to the need to change the physical design. As well, the need to change the operating bias points of device may be inconvenient for factory calibration or transmitter self-calibration, because manual operation or special algorithms are required and additional time is required to allow the devices to stabilize at the new bias points.

Some other existing calibration solutions are software-based and implemented in the receiver DSP. Estimation of transmitter IQ skew and receiver IQ skew can be calculated at the receiver DSP, without the need for added electrical or optical components. Because the IQ skew typically varies slowly, the calibration can be implemented in the software level, such as on a slower processing device attached to the real-time application-specific integrated circuit (ASIC) DSP chip, or by sending the signals to an external service node in the optical network for calibration. Some existing software-based calibration techniques rely on two-stage skew estimation, by first estimating and compensating for the receiver IQ skew and then estimating and compensating for the transmitter IQ skew. However, it has been found that the transmitter IQ skew and receiver IQ skew estimations affect each other. Further, the need to use two separate stages for estimation and compensation requires a longer time for calibration, which can be a problem when there is a large number of transceivers to calibrate in a factory.

Example methods and apparatuses described herein enable joint estimation of the transmitter IQ skew and receiver IQ skew. Examples described herein may be implemented using a single MIMO equalizer (e.g., a 4×8 MIMO equalizer) implemented in the DSP at the receiver, instead of using a two-stage equalization approach.

Figure 2:
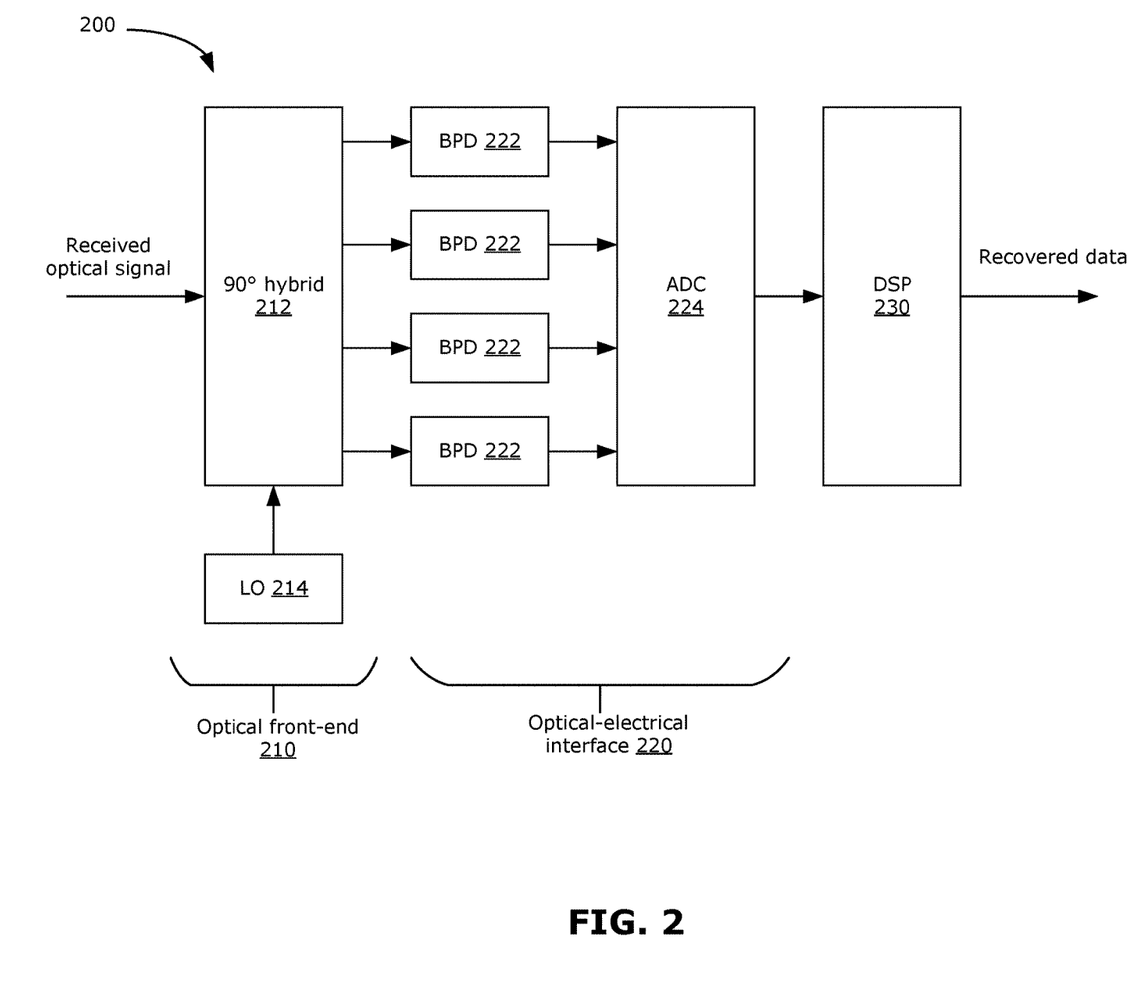
FIG. 2 is a block diagram of an example digital coherent receiver, in which examples described herein may be implemented.

FIG. 2 is a block diagram illustrating an example receiver 200 in which examples described herein may be implemented. In particular, the receiver 200 is a digital coherent receiver, which includes an optical front-end 210, an optical-electrical interface 220 and a DSP 230.

The optical front-end 210 receives an optical signal over an optical channel (e.g., optical fiber), and serves to separate the received optical signal into four branches (corresponding to the X- and Y-polarizations for each of the I and Q channels). The optical front-end 210 includes a 90° optical hybrid 212, and a local oscillator (LO) 214. The four signals from the optical front-end 210 are provided to the optical-electrical interface 220. In the optical-electrical interface 220, a set of balanced photodetectors (BPDs) 222 serves to detect each of the four optical signals and convert them to respective electrical signals. An analog-to-digital converter (ADC) 224 receives the electrical signals and performs signal sampling and quantization to output digital signals. Although the output of the ADC 224 is illustrated as a single arrow, it should be understood that the output of the ADC 224 includes four digital signals corresponding to the four channels.

The digitized signal from the ADC 224 is inputted to the DSP 230. The DSP 230 may be implemented using a customized ASIC chip, for example. The DSP 230 implements algorithms to compensate for impairments introduced into the signal, including compensating for IQ skew. In particular, as discussed further below, the DSP 230 in the present disclosure implements a 4×8 MIMO equalizer in either ASIC or software that enables joint estimation of the transmitter IQ skew and the receiver IQ skew.

Figure 3:
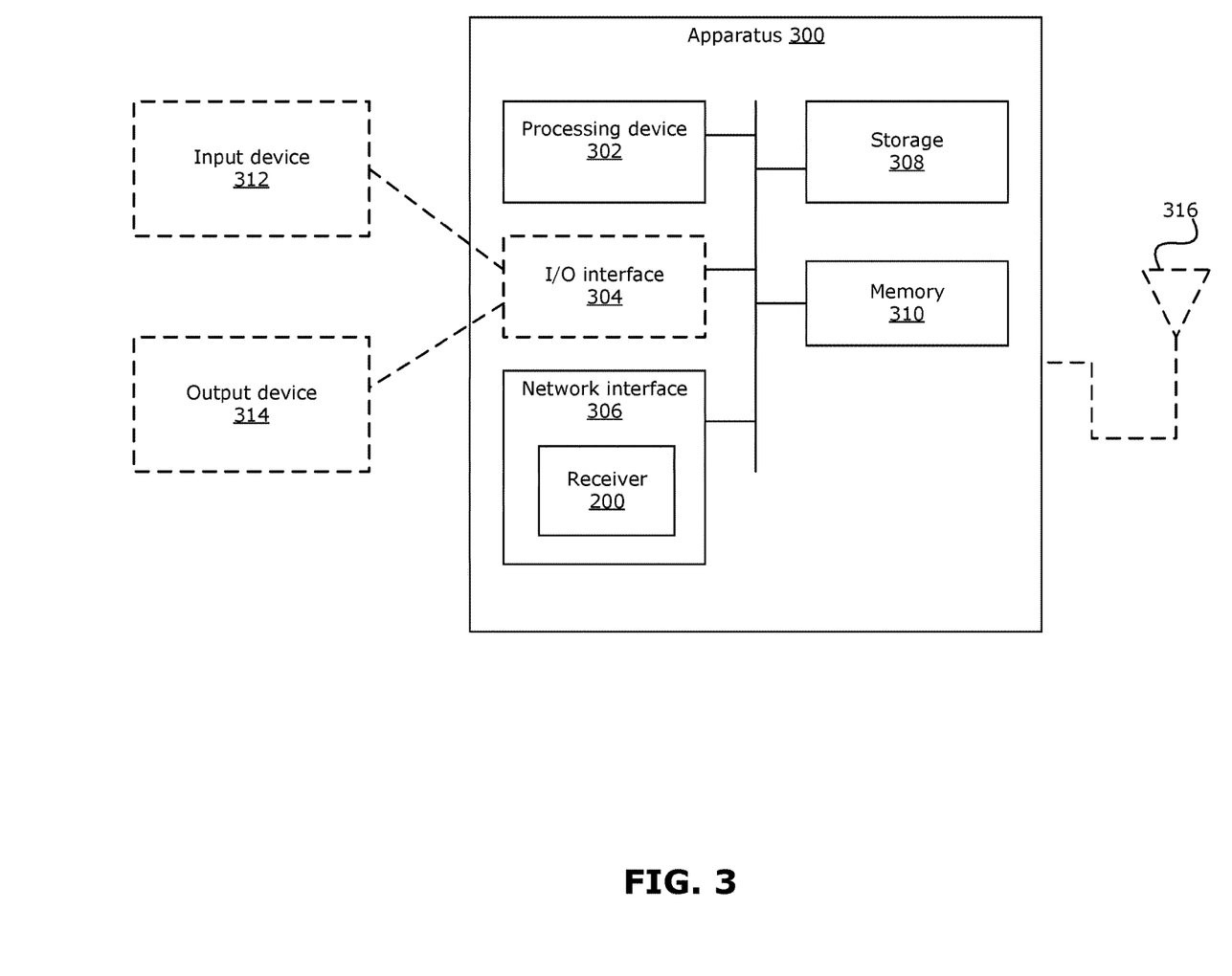
FIG. 3 is a block diagram of an example apparatus in which the receiver of FIG. 2 may be implemented.

FIG. 3 is a block diagram illustrating an example apparatus 300 in which the receiver 200 may be implemented. For example, the apparatus 300 may be an electronic device, such as a server, a computing system, an access point (AP), a terminal device, etc. The apparatus 300 is capable of optical communications, and may optionally also have capabilities for wireless communications. Other communication devices suitable for implementing examples described in the present disclosure may be used, which may include components different from those discussed below. Although FIG. 3 shows a single instance of each component, there may be multiple instances of each component in the apparatus 300 and the apparatus 300 could be implemented using parallel and/or distributed architecture.

In this example, the apparatus 300 includes one or more processing devices 302, such as a processor, a microprocessor, an ASIC, a field-programmable gate array (FPGA), a dedicated logic circuitry, or combinations thereof. The apparatus 300 may also include one or more optional input/output (I/O) interfaces 304, which may enable interfacing with one or more optional input devices 312 and/or output devices 314. The apparatus 300 includes one or more network interfaces 306, including the receiver 200 for receiving an optical signal. The network interface(s) 306 may additionally include a transmitter (not shown) for transmitting an optical signal. The receiver 200 and transmitter may be implemented using an optical coherent transceiver.

Optionally, if the apparatus 300 has capabilities for both optical communications and wireless communications, the apparatus 300 may include one or more antennas 316 to enable wireless communication. In this example, one antenna 316 is shown, which may serve for both transmitter and receiver. However, in other examples there may be multiple antennas for transmitting and receiving. In examples where the apparatus 300 does not have capability for wireless communications, the antenna(s) 316 may be omitted.

The apparatus 300 includes one or more storage units 308, which may include a mass storage unit such as a solid state drive, a hard disk drive, a magnetic disk drive and/or an optical disk drive. The apparatus 300 also includes one or more memories 310, which may include a volatile or non-volatile memory (e.g., a flash memory, a random access memory (RAM), and/or a read-only memory (ROM)). The non-transitory memory(ies) 310 (as well as storage 308) may store instructions for execution by the processing device(s) 302. The memory(ies) 310 may include software instructions, such as for implementing an operating system (OS), and other applications/functions. In some examples, instructions may also be provided by an external memory (e.g., an external drive in wired or wireless communication with the apparatus 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Optional input device(s) 312 (e.g., a keyboard, a mouse, a microphone, a touchscreen, and/or a keypad) and optional output device(s) 314 (e.g., a display, a speaker and/or a printer) are shown as external to the apparatus 300, and connected to optional I/O interface 304. In other examples, one or more of the input device(s) 312 and/or the output device(s) 314 may be included as a component of the apparatus 300.

As mentioned above, the present disclosure describes examples for joint estimation and calibration of transmitter IQ skew and receiver IQ skew, using a 4×8 MIMO equalizer implemented in the receiver DSP. In particular, the 4×8 MIMO equalizer may be implemented as a 4×8 MIMO finite impulse response (FIR) filter. The coefficients (also referred to as filter taps) of the MIMO equalizer enables calculation of the transmitter and receiver IQ skews, or more generally the transmitter and receiver IQ differential phase responses. In the skew estimation techniques disclosed herein, transmitter impairment and receiver impairment do not affect each other. The disclosed 4×8 equalizer-based calibration may be integrated on real-time chips or in the calibration software for in-service calibration, without the need for additional optical or electrical devices.

Figure 4A:
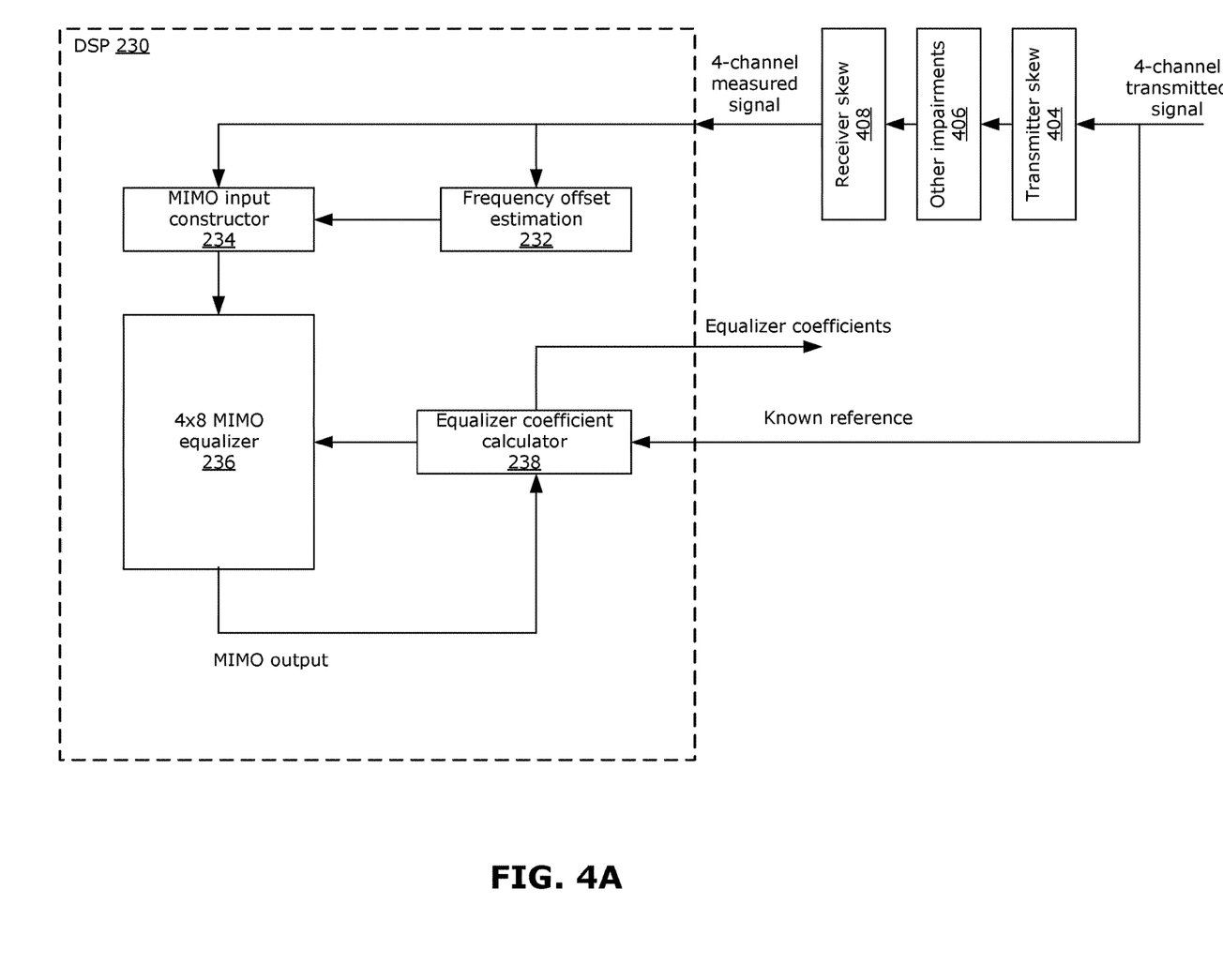
FIG. 4A is a block diagram illustrating some details of an example DSP for estimating IQ skew.

FIG. 4A is a block diagram illustrating an example of skew calibration using a 4×8 MIMO equalizer in an optical coherent transceiver. The calibration illustrated in FIG. 4 may be performed in a factory setting, for example, using simulators and/or testing equipment to emulate/generate the effect of impairments. The factory calibration starts from the 4-channel measured signal. The overall channel from the 4-channel transmitted signal to the 4-channel measured signal is simplified to have three ordered blocks only, namely the transmitter skew 404, other optical impairments 406, and receiver skew 408, which represent in practice the coherent transmitter, the optical channel (fiber) and the coherent receiver, respectively.

A known, 4-channel transmitted signal (which is an electrical signal) is used as the reference signals (that is, the target signals for optimization of the equalizer). The four transmitted channels may be denoted as $i_x$, $q_x$, $i_y$, $q_y$, and each of the transmitted channel is a time-series at DSP rate. These may be represented in a vector as follows:

$$\begin{bmatrix} i_x \\ q_x \\ i_y \\ q_y \end{bmatrix}$$

The transmitted signal experiences transmitter skew 404, other impairments 406 and receiver skew 408. The transmitter skew 404 and receiver skew 408 may be introduced by actual physical components of the optical coherent transceiver. It may be assumed that the time skews are non-zero. Other impairments 406 include impairments other than IQ skew, for example local oscillator frequency offset (LOFO), phase noise (PN), polarization-dependent loss (PDL), polarization mode dispersion (PMD), amplified spontaneous emission (ASE), and other channel impairments. The effect of channel impairments may be simulated, or created using testing equipment, for example. The resulting 4-channel signal (which is an electrical signal) measured by the receiver is received into the DSP 230. The measured signal may be denoted as $r'_{XI}$, $r'_{XQ}$, $r'_{YI}$, $r'_{YQ}$, where the prime sign denotes the measured quantity (i.e., the real captured data). Each of the measured channels is also a time series obtained from the ADC 224 in the coherent receiver 200. The measured signal may be represented in a vector as follows:

$$\begin{bmatrix} r_{XI} \\ r_{XQ} \\ r_{YI} \\ r_{YQ} \end{bmatrix}'$$

FIG. 4A shows the DSP 230 implementing various example software modules, such as a frequency offset estimation 232, MIMO input constructor 234, 4×8 MIMO equalizer 236 and equalizer coefficient calculator 238. It should be understood that, although illustrated as individual blocks for ease of understanding, it should be understood that the functions of these modules may be implemented by the DSP 230 as a single set of instructions.

At the DSP 230, the measured signal is inputted into a frequency offset estimation algorithm 232, which estimates the carrier frequency offset between the transmitter and the receiver. Various suitable techniques may be used to estimate the carrier frequency offset, such as using fast Fourier transform (FFT)-base techniques, among others. The estimated carrier frequency offset may be denoted as $\hat{\omega}_{LO}$.

The estimated carrier frequency offset and the measured signal are inputted to a MIMO input constructor 234, which constructs the eight inputs for the 4×8 MIMO equalizer 236 (e.g., a 4×8 MIMO-FIR filter) by adding conjugate replicas. At the MIMO input constructor 234, each of the four real-valued time-series inputs $r'_{XI}$, $r'_{XQ}$, $r'_{YI}$, $r'_{YQ}$ is multiplied pointwise with a phasor e-Pot, which is a complex-valued time sequence based on the estimated carrier frequency offset. The inputs $r'_{XQ}$ and $r'_{YQ}$ are each multiplied by the imaginary number j. The MIMO input constructor 234 constructs the input to the 4×8 MIMO equalizer 236 using the resulting four complex-valued time sequences and their respective conjugate replicas.

Figure 4B:
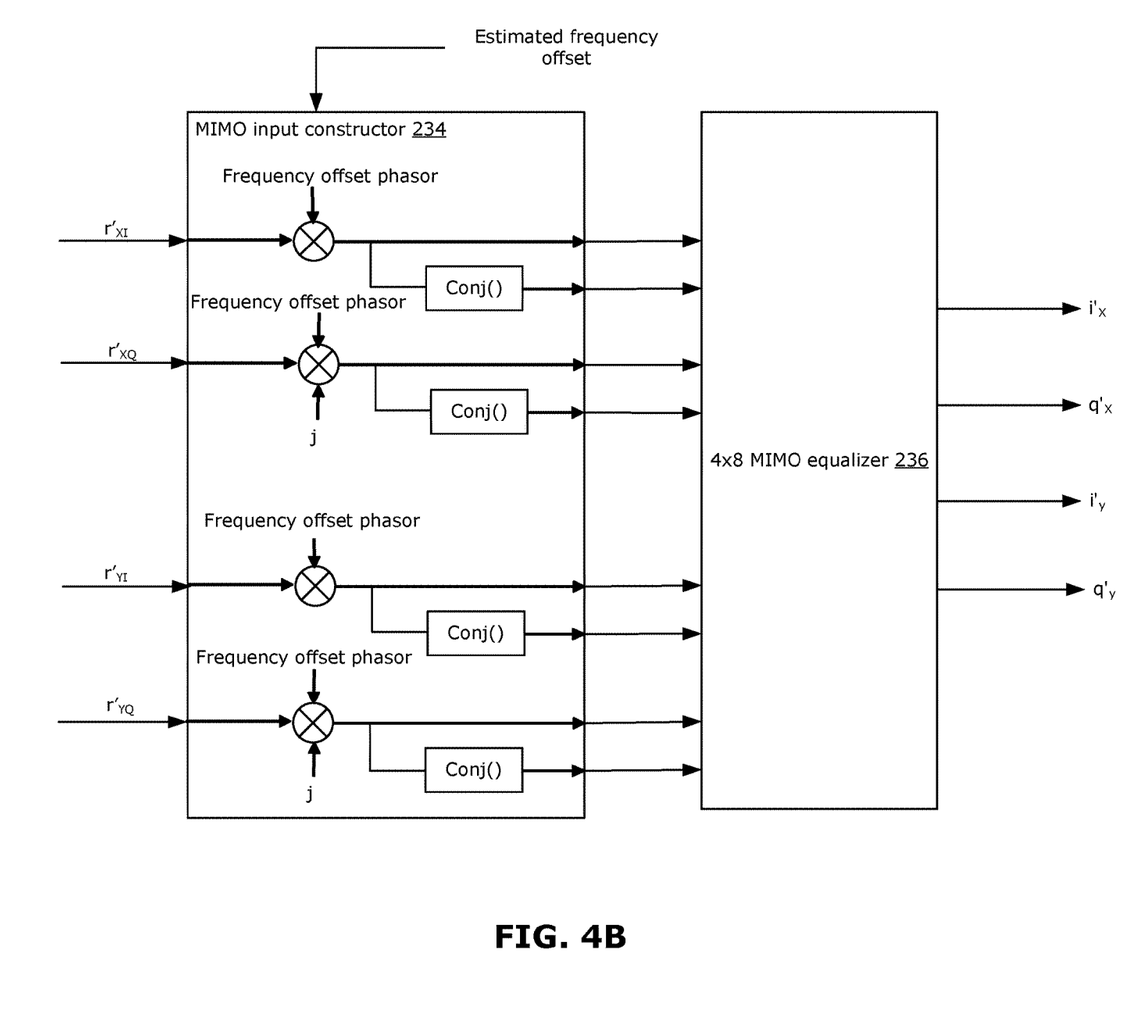
FIG. 4B is a block diagram illustrating some details of an example MIMO input constructor.

FIG. 4B illustrates an example implementation of the MIMO input constructor 234. As shown in FIG. 4B, each channel of the measured signal is received as a respective input. The four inputs are converted to complex inputs by multiplying a carrier frequency offset phasor (using the estimated carrier frequency offset from the frequency offset estimation 232) on each of them. Additionally, the X- and Y-polarization Q channel inputs are multiplied with the imaginary number. Conjugate replicas are generated for each of these four complex inputs using a conj( ) operation. The result is a set of eight inputs that are provided to the 4×8 MIMO equalizer 236.

These eight time sequence inputs may be denoted by $\vec{x}_j$, where j=1, 2, , 8 (not to be confused with the imaginary number j). The inputs to the 4×8 MIMO equalizer 236 may be represented as follows:

$$\begin{bmatrix} \vec{x}_1 \\ \vec{x}_2 \\ \vec{x}_3 \\ \vec{x}_4 \\ \vec{x}_5 \\ \vec{x}_6 \\ \vec{x}_7 \\ \vec{x}_8 \end{bmatrix} = \begin{bmatrix} r_{XI} \odot e^{-j\hat{\omega}_{LO}t} \\ jr_{XQ} \odot e^{-j\hat{\omega}_{LO}t} \\ r_{YI} \odot e^{-j\hat{\omega}_{LO}t} \\ jr_{YQ} \odot e^{-j\hat{\omega}_{LO}t} \\ [r_{XI} \odot e^{-j\hat{\omega}_{LO}t}]^* \\ [jr_{XQ} \odot e^{-j\hat{\omega}_{LO}t}]^* \\ [r_{YI} \odot e^{-j\hat{\omega}_{LO}t}]^* \\ [jr_{YQ} \odot e^{-j\hat{\omega}_{LO}t}]^* \end{bmatrix}'$$

where the sign "⊙" represents pointwise multiplication between two vectors having the same length. The eight inputs are inputted to the 4×8 MIMO equalizer 236, which may be represented as the following 4×8 matrix of coefficients:

$$\begin{bmatrix} c_{11} & c_{12} & c_{13} & c_{14} & c_{15} & c_{16} & c_{17} & c_{18} \\ c_{21} & c_{22} & c_{23} & c_{24} & c_{25} & c_{26} & c_{27} & c_{28} \\ c_{31} & c_{32} & c_{33} & c_{34} & c_{35} & c_{36} & c_{37} & c_{38} \\ c_{41} & c_{42} & c_{43} & c_{44} & c_{45} & c_{46} & c_{47} & c_{48} \end{bmatrix}$$

After filtering in the time domain, the outputs of the 4×8 MIMO equalizer 236 are four real-valued time sequences. This filtering may be represented as:

$$\begin{bmatrix} i_X \\ q_X \\ i_Y \\ q_Y \end{bmatrix}' = \begin{bmatrix} c_{11} & c_{12} & c_{13} & c_{14} & c_{15} & c_{16} & c_{17} & c_{18} \\ c_{21} & c_{22} & c_{23} & c_{24} & c_{25} & c_{26} & c_{27} & c_{28} \\ c_{31} & c_{32} & c_{33} & c_{34} & c_{35} & c_{36} & c_{37} & c_{38} \\ c_{41} & c_{42} & c_{43} & c_{44} & c_{45} & c_{46} & c_{47} & c_{48} \end{bmatrix} * \begin{bmatrix} \vec{x}_1 \\ \vec{x}_2 \\ \vec{x}_3 \\ \vec{x}_4 \\ \vec{x}_5 \\ \vec{x}_6 \\ \vec{x}_7 \\ \vec{x}_8 \end{bmatrix}$$

where * indicates the convolution operation in time domain, cis is the time domain coefficient (also referred to as filter tap) between the i-th output and the j-th input, where i=1, 2, 3, 4, j=1, 2, , 8, and $i'_x$, $q'_x$, $i'_y$, $q'_y$ are the real-valued time sequences outputted by the 4×8 MIMO equalizer 236. It should be noted that each coefficient $c_{ij}$ is actually a vector of n taps, where n is a user-defined hyperparameter (e.g., chosen depending on practical implementation in ASIC or software).

The MIMO output and the known reference signal (i.e., the known transmitted signal) are inputted to the equalizer coefficient calculator 238 to calculate the coefficients of the 4×8 MIMO equalizer 236. The coefficients are optimized by minimizing the mean squared error between the MIMO output and the known reference, which is mathematically written as:

$$\begin{bmatrix} c_{11} & c_{12} & c_{13} & c_{14} & c_{15} & c_{16} & c_{17} & c_{18} \\ c_{21} & c_{22} & c_{23} & c_{24} & c_{25} & c_{26} & c_{27} & c_{28} \\ c_{31} & c_{32} & c_{33} & c_{34} & c_{35} & c_{36} & c_{37} & c_{38} \\ c_{41} & c_{42} & c_{43} & c_{44} & c_{45} & c_{46} & c_{47} & c_{48} \end{bmatrix}_{opt} = \min_{c_{ij}} \left\| \begin{bmatrix} i_X \\ q_X \\ i_Y \\ q_Y \end{bmatrix}' - \begin{bmatrix} i_X \\ q_X \\ i_Y \\ q_Y \end{bmatrix} \right\|^2$$

Various techniques may be used to perform this calculation by the equalizer coefficient calculator 238 including, for example, least-square (LS) techniques (e.g., using matrix inversion), or least-mean-square (LMS) techniques. LS techniques may be suitable for implementation during factory calibration. LMS techniques may be suitable for implementation during self-calibration or in-service monitoring, for example.

An example calculation for the coefficients is now described. The error between the MIMO output and the known reference may be expressed as:

$$e_{XI}[t] = i_x[t] - i'_x[t]$$

$$e_{XQ}[t] = q_x[t] - q'_x[t]$$

$$e_{YI}[t] = i_y[t] - i'_y[t]$$

$$e_{YQ}[t] = q_y[t] - q'_y[t]$$

where t is the time index, $e_{XI}$, $e_{XQ}$, $e_{YI}$, $e_{YQ}$ are the errors in the respective XI, XQ, YI and YQ channels, and $i_x[t]$, $q_x[t]$, $i_y[t]$, $q_y[t]$ are the training time sequences in the training mode (e.g., during calibration) or the decision time sequences in the tracking mode (e.g., for real-time equalization, or for calibration in ASIC-DSP using adaptive LMS). The above quantities are all scalar.

It should be noted that, in examples where frequency drift is fast (e.g., due to random laser phase noise), the estimated carrier frequency offset (from the frequency offset estimation 232) may not fully reflect the dynamics of the frequency drift (since the frequency offset estimation 232 is intended to estimate carrier frequency offset, which is typically slow relative to the symbol rate of DSP), in which case the frequency dynamic may be considered to be phase noise. This phase noise may be estimated by a carrier phase recovery algorithm (not shown).

The estimated carrier phase may be denoted as $\hat{\theta}[t]$, in which case the error for the 4×8 MIMO equalizer 236 may be represented as:

$$e_{XI}[t] = i_x[t]\cos\hat{\theta}[t] - q_x[t]\sin\hat{\theta}[t] - i_x'[t]$$

$$e_{XQ}[t] = i_x[t]\sin\hat{\theta}[t] - q_x[t]\cos\hat{\theta}[t] - q_x'[t]$$

$$e_{YI}[t] = i_y[t]\cos\hat{\theta}[t] - q_y[t]\sin\hat{\theta}[t] - i_y'[t]$$

$$e_{YQ}[t] = i_y[t]\sin\hat{\theta}[t] - q_y[t]\cos\hat{\theta}[t] - q_y'[t]$$

As previously mentioned, each coefficient cis is an n-tap filter, which may be represented as:

$$\vec{c}_{i,j} = [c_{i,j}(1), c_{i,j}(2), , c_{i,j}(n)]^T$$

The n taps of coefficient $c_{ij}$ at time t may be represented in a vectorized form as:

$$\vec{c}_j[t] = [c_{i,j}(t+1), c_{i,j}(t+2), , c_{i,j}(t+n)]^T$$

The eight time sequence inputs to the 4×8 MIMO equalizer 236 may be denoted by $\vec{x}_j$, where $\vec{x}_j[t]$ may denote the j-th input at time t, where j=1, 2, , 8. For example, $\vec{x}_j[t]$ may be represented as:

$$\vec{x}_j[t] = [x_j(t+1), x_j(t+2), , x_j(t+n)]^T$$

The equalizer coefficient calculator 238 may implement an adaptive LMS algorithm for real-time DSP implementation using the following updates:

$$\vec{c}_{1,j}[t+1] = \vec{c}_{1,j}[t] + \mu e_{XI}[t]\vec{x}_j[t]$$

$$\vec{c}_{2,j}[t+1] = \vec{c}_{2,j}[t] + \mu e_{XQ}[t]\vec{x}_j[t]$$

$$\vec{c}_{3,j}[t+1] = \vec{c}_{3,j}[t] + \mu e_{YI}[t]\vec{x}_j[t]$$

$$\vec{c}_{4,j}[t+1] = \vec{c}_{4,j}[t] + \mu e_{YQ}[t]\vec{x}_j[t]$$

where μ is LMS step size, which may be selected to control the speed of convergence. After convergence, the equalizer coefficient calculator 238 outputs the set of 4×8 coefficients $c_{ij}$ to by implemented by the 4×8 MIMO equalizer 236. The set of 4×8 coefficients $c_{ij}$ is outputted to enable the transmitter IQ skew and receiver IQ skew to be determined in the frequency domain. As previously discussed, a time shift in the time domain translates to a linear phase shift in the frequency domain, which can be calculated as the differential phase response between I and Q. Accordingly, calculations in the frequency domain, as discussed below, may be performed using the calculated 4×8 coefficients $c_{ij}$ to estimate the IQ skew in both the transmitter and the receiver. The calculations to estimate the IQ skew may be performed by another processing device (e.g., a slower processing device (not shown) external to the DSP 230) of the apparatus 300 in which the receiver 200 is implemented, using the equalizer coefficients outputted from the DSP 230. In some examples, estimation of the IQ skew may be performed by the DSP 230 itself. The estimated IQ skew may then be used to compensate for IQ skew, using suitable techniques (e.g., by adding a corresponding phase shift to sampling clocks at the ADC 224).

In the following equations, $C_{ij}$ (uppercase to indicate frequency domain) denotes the fast Fourier transform (FFT) of the equalizer coefficients $c_{ij}$ (lowercase to indicate time domain). In the following equations, the notation * is used to indicate the conjugate of a complex quantity; and the operation "arg" extracts the argument (i.e., angel) of a complex quantity. It should be noted that if the output of "arg" changes abruptly by +/−π, an "unwrap" function is required to correct this abrupt change.

For determining the transmitter IQ skew, the transmitter IQ differential phase response for X-polarization (denoted as $\varphi_{X,Tx}(f)$) and the transmitter IQ differential phase response for Y-polarization (denoted as $\varphi_{Y,Tx}(f)$) can be first estimated by performing the calculations:

$$\varphi_{X,Tx}(f) = 0.5\ \arg\{(C_{11}C_{15} + C_{12}C_{16} + C_{13}C_{17} + C_{14}C_{18})(C_{21}C_{25} + C_{22}C_{26} + C_{23}C_{27} + C_{24}C_{28})^*\}$$

$$\varphi_{Y,Tx}(f) = 0.5\ \arg\{(C_{31}C_{35} + C_{32}C_{36} + C_{33}C_{37} + C_{34}C_{38})(C_{41}C_{45} + C_{42}C_{46} + C_{43}C_{47} + C_{44}C_{48})^*\}$$

Then, the transmitter IQ skew for X-polarization (denoted as $\tau_{X,TI}$) and the transmitter IQ skew for Y-polarization (denoted as $\tau_{Y,Tx}$) can be estimated by performing the calculations:

$$\tau_{X,Tx} = \frac{1}{2\pi}\frac{d\varphi_{X,Tx}(f)}{df}$$

$$\tau_{Y,Tx} = \frac{1}{2\pi}\frac{d\varphi_{Y,Tx}(f)}{df}$$

It should be noted that, although the above equations indicate that the derivative of the differential phase response is calculated, in real-life implementation the differential phase response may not be perfectly linear in frequency. Accordingly, instead of the calculated derivative, the slope of a linear fit of the differential phase response may be used instead. For example, the slope of a linear fit to the differential phase response may be taken from −Baud/2 to Baud/2, divided by 2π (or over the product DSP bandwidth). The same applies to other calculations disclosed herein that use the derivative of the differential phase response.

For determining the receiver IQ skew, the receiver IQ differential phase response for X-polarization (denoted as $\varphi_{X,Rx}(f)$) and the receiver IQ differential phase response for Y-polarization (denoted as $\varphi_{Y,Rx}(f)$) can be first estimated by performing the calculations:

$\varphi_{X,Rx}(\omega) = -\arg\{C_{11}(C_{12})^* + C_{31}(C_{32})^* + C_{21}(C_{22})^* + C_{41}(C_{42})^* + C_{15}(C_{16}C_{35}(C_{36})^* + C_{25}(C_{26})^* + C_{45}(C_{46})^*\}$ $\varphi_{Y,Rx}(\omega) = -\arg\{C_{13}(C_{14})^* + C_{33}(C_{34})^* + C_{23}(C_{24})^* + C_{43}(C_{44})^* + C_{17}(C_{18})^* + C_{37}(C_{38})^* + C_{27}(C_{28})^* + C_{47}(C_{48})^*\}$ Then, the receiver IQ skew for X-polarization (denoted as $\tau_{X,Rx}$) and the receiver IQ skew for Y-polarization (denoted as $\tau_{Y,Rx}$) can be estimated by performing the calculations:

$$\tau_{X,Rx} = \frac{1}{2\pi}\frac{d\varphi_{X,Rx}(f)}{df}$$

$$\tau_{Y,Rx} = \frac{1}{2\pi}\frac{d\varphi_{Y,Rx}(f)}{df}$$

Using the estimated transmitter IQ skew and the receiver IQ skew, calibration of the transceiver may be performed to compensate for the estimated skew. For example, the estimated skew for each of the four channels (XI, XQ, YI and YQ) can be compensated by shifting the sampling clocks at the ADC 224 of the receiver 200 by a corresponding amount. The calibration may be factory calibration (e.g., prior to commissioning the transceiver for real-world use).

In some examples, remote calibration of a transmitter may be carried out using the estimated IQ skew. For example, a reference signal, which is known to both a transmitting apparatus 300 and a receiving apparatus 300, may be transmitted from the transmitting apparatus 300 to the receiving apparatus 300. After the receiving apparatus 300 estimates the transmitter IQ skew (as described above), the receiving apparatus 300 may communicate the estimated transmitter IQ skew (e.g., as a control signal, or as a packet) to the transmitting apparatus 300 to enable the transmitting apparatus 300 to calibrate itself.

In some examples, the estimated IQ skew may be used for in-service monitoring of a channel. For example, a slower processing device that is separate from the DSP 230 may be used to estimate slow-varying skew (since channel characteristics are expected to be slowly changing and relatively static). In another example, the DSP 230 may perform this monitoring of slow-varying skew.

It should be noted that the calculated coefficients for the 4×8 MIMO equalizer provide information about the full IQ differential phase response of the transmitter and receiver, and may also be used to estimate other impairments in addition to estimating IQ skew. For example, the differential phase information provided by the coefficients also enable calculation of skew between the X- and Y-polarizations (also referred to as XY skew). XY skew may be introduced at the transmitter and the receiver due, for example, PMD effects.

The following equations may be used to estimate any skew between the four channels XI, XQ, YI and YQ. In the following equations, subscripts 1, 2, 3 and 4 represents XI, XQ, YI and YQ respectively. Any channel skews at the transmitter and at the receiver can be estimated using the following phase differences:

$$\theta_j^{Tx}(f) - \theta_i^{Tx}(f) = \frac{1}{8}\arg\left\{\frac{C_{j1}C_{j5} \cdot C_{j2}C_{j6} \cdot C_{j3}C_{j7} \cdot C_{j4}C_{j8}}{C_{i1}C_{i5} \cdot C_{i2}C_{i6} \cdot C_{i3}C_{i7} \cdot C_{i4}C_{i8}}\right\}$$

$$\theta_j^{Rx}(f) - \theta_i^{Rx}(f) = \frac{1}{8}\arg\left\{\frac{C_{3j}C_{4j}C_{3(4+j)}C_{4(4+j)}}{(C_{1j}C_{2j}C_{1(4+j)}C_{2(4+j)})^*} \cdot \left[\frac{C_{3i}C_{4i}C_{3(4+i)}C_{4(4+i)}}{[C_{1i}C_{2i}C_{1(4+i)}C_{2(4+i)}]^*}\right]^*\right\}$$

Then the channel skews at the transmitter (denoted as $\tau_{ji,Tx}$) and the channel skews at the receiver (denoted as $\tau_{ji,Rx}$) may be estimated as:

$$\tau_{ji,Tx} = \frac{1}{2\pi}\frac{d}{df}\left[\theta_j^{Tx}(f) - \theta_i^{Tx}(f)\right]$$

$$\tau_{ji,Rx} = \frac{1}{2\pi}\frac{d}{df}\left[\theta_j^{Rx}(f) - \theta_i^{Rx}(f)\right]$$

The XY skews at the transmitter and the receiver can be estimated using the following phase differences:

$$\frac{\theta_3^{Tx}(f) + \theta_4^{Tx}(f)}{2} - \frac{\theta_1^{Tx}(f) + \theta_2^{Tx}(f)}{2} =$$
$$\frac{1}{16}\arg\left\{\frac{C_{31}C_{35} \cdot C_{32}C_{36} \cdot C_{33}C_{37} \cdot C_{34}C_{38}}{C_{11}C_{15} \cdot C_{12}C_{16} \cdot C_{13}C_{17} \cdot C_{14}C_{18}} \times \frac{C_{41}C_{45} \cdot C_{42}C_{46} \cdot C_{43}C_{47} \cdot C_{44}C_{48}}{C_{21}C_{25} \cdot C_{22}C_{26} \cdot C_{23}C_{27} \cdot C_{24}C_{28}}\right\}$$

$$\frac{\theta_3^{Rx}(f) + \theta_4^{Rx}(f)}{2} - \frac{\theta_1^{Rx}(f) + \theta_2^{Rx}(f)}{2} = \frac{1}{2}\arg\{(C_{11}C_{16})^* C_{13}C_{18} + (C_{21}C_{26})^* C_{23}C_{28} + (C_{31}C_{36})^* C_{33}C_{38} + (C_{41}C_{46})^* C_{43}C_{48}\}$$

Then the XY skew at the transmitter (denoted as $\tau_{YX,Tx}$) and the XY skew at the receiver (denoted as $\tau_{YX,Rx}$) may be estimated as:

$$\tau_{YX,Tx} = \frac{1}{2\pi}\frac{d}{df}\left[\frac{\theta_3^{Tx}(f) + \theta_4^{Tx}(f)}{2} - \frac{\theta_1^{Tx}(f) + \theta_2^{Tx}(f)}{2}\right]$$

Such calculations may be performed by another processing device external to the DSP 230, to calibrate the transceiver for the transmitter skew and the receiver skew. For example, such calculations may be performed during factory calibration, and the estimated XY skew at the transmitter and at the receiver may be compensated in the transmitter DSP and in the receiver DSP, respectively (e.g., by adjusting electrical filter phase responses and/or other parameters).

In some examples, the DSP 230 may be implemented using real-time ASIC-DSP, for real-time estimation of transmitter and receiver skew, and for equalizing any linear impairments such as IQ crosstalk, IQ skew, XY skew, gain imbalance and quadrature phase error.

Figure 5:
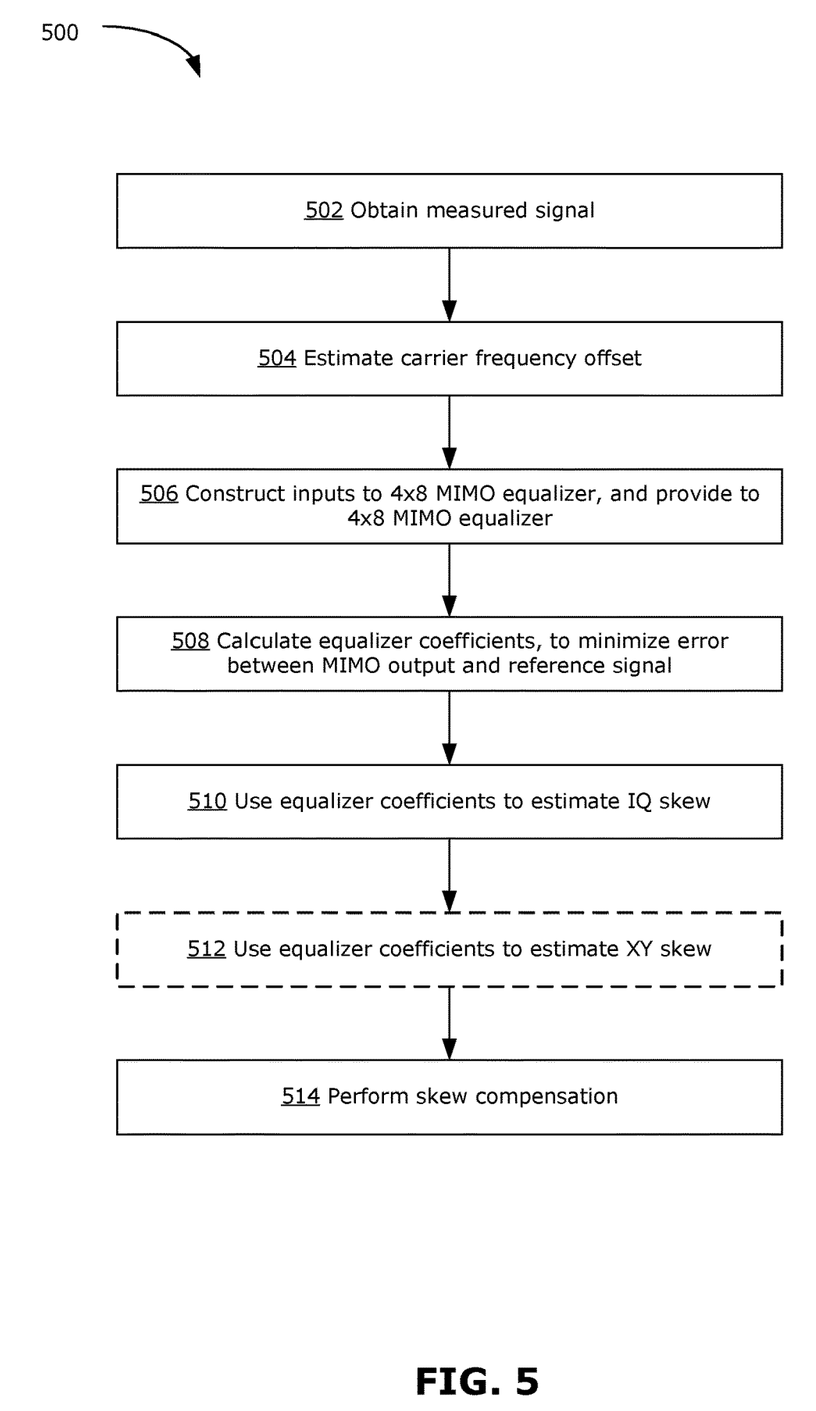
FIG. 5 is a flowchart showing an example method for estimating and compensating for skew in a coherent transceiver.

FIG. 5 is a flowchart illustrating an example method 500 for estimating and compensating for skew in a coherent transceiver, which may be performed using the 4×8 MIMO equalizer 236 implemented by the DSP 230. In some examples, a slower processing unit external to the DSP 230 may also be used to perform some steps of the method 500. The method 500 may be used for factory calibration, remote calibration, self-calibration and/or in-serving monitoring, as discussed above. For example, in factory calibration (prior to the transceiver being deployed for use), the method 500 may be used to calibrate the transceiver (e.g., using the DSP 230 together with an external desktop computing system). After the transceiver has been deployed for use, the method 500 may be implemented by the transceiver itself (e.g., using the DSP 230 together with a slower processor of the transceiver) to calibrate its own impairment. In a coherent transceiver, the transmitter and receiver are implemented at the same module, thus enabling the self-calibration is possible.

At 502, a measured signal is obtained at the DSP 230 of a receiver. For in-service applications, the measured signal is a digital electrical signal that is the result of detecting and converting an optical signal (corresponding to a known electrical reference signal from a transmitter) received by the receiver over an optical channel. For factory calibration, the measured signal is a digital electrical signal that is the result of detecting and converting an optical signal (corresponding to a known electrical reference signal from a transmitter) received by the receiver over a short optical fiber. Generally, the measured signal is a four-channel signal, $r'_{XI}, r'_{XQ}, r'_{YI}, r'_{YQ}$, having the information of the transmitted XI, XQ, YI and YQ channels.

At 504, the carrier frequency offset between the measured signal and the reference signal is estimated. Various suitable techniques may be used to estimate the carrier frequency offset, such as FFT-based techniques.

At 506, inputs to the 4×8 MIMO equalizer 236 are constructed. Construction of the eight inputs involve converting the four channels of the measured signal into four complex inputs (in which the X- and Y-polarized signals on the I channel are real inputs, and the X- and Y-polarized signals on the Q channel are converted to imaginary inputs), each of which have phase shifts corresponding to the estimated carrier frequency offset. Then respective conjugate replicas are generated for each of the four complex inputs. The eight inputs are then provided to the 4×8 MIMO equalizer.

At 508, equalizer coefficients are calculated such that the error between the MIMO output and the known reference signal is minimized. Various optimization techniques may be used. For example, an adaptive LMS technique may be used, over multiple iterations until convergence. The calculated equalizer coefficients are then outputted to be used for estimation of skew.

At 510, the equalizer coefficients are used to estimate transmitter IQ skew and receiver IQ skew. The estimation of skew may be performed by the DSP 230, or may be performed by another processing device external to the DSP 230. The estimation of IQ skew involves converting the time domain equalizer coefficients to frequency domain equalizer coefficients (e.g., using FFT). The differential phase response at each of the receiver and the transmitter (and for each polarization) is determined and the slope of the respective differential phase response is used as the estimate of respective IQ skew at each of the receiver and the transmitter (and for each polarization). Calculations for estimating IQ skew may be carried out in accordance with the equations described above.

Optionally, at 512, the equalizer coefficients may be used to estimate other channel skews, such as XY skew. Other channel skews may be estimated using the frequency domain equalizer coefficients (e.g., converted from the time domain equalizer coefficients at 510 above). The phase difference between channels may be determined and the slope of the phase difference may be used as the estimate of respective channel skew. Calculations for estimating channel skew, including XY skew, may be carried out in accordance with the equations described above.

At 514, skew compensation is performed, using the estimations calculated at 510 and optionally at 512. For example, skew compensation may be performed by adjusting the phase of sampling clocks at the ADC. For a complete compensation, the IQ differential phase response may be compensated at the expense of higher computational cost. For remote calibration, transmitter skew compensation may be performed by transmitting information about the estimated transmitter skew from the receiver back to the transmitter, to enable the transmitter to implement a corresponding phase shift in its channels.

As previously mentioned, the method 500 may be implemented for factory calibration of an optical coherent transceiver, self-calibration of the transceiver and/or real-time equalizer of the receiver module within the transceiver. For example, the method 500 may be implemented entirely by the ASIC-DSP of the receiver (e.g., for real-time equalization, or self-calibration of the transceiver). The method 500 may also be implemented by the ASIC-DSP of the receiver together with a slower processor of the receiver that is communicatively coupled to the ASIC-DSP (e.g., for self-calibration of the transceiver). The method 500 may also be implemented by the ASIC-DSP running under control of an external processor (e.g., a central processing unit (CPU) of a desktop computing system that communicates data to and from the ASIC-DSP) (e.g., for factory calibration). It should be understood that the method 500 may also be performed in other scenarios, such as remote calibration of a transmitter.

In various examples, the present disclosure describes the use of a one-stage 4×8 MIMO equalizer (e.g., implemented as a 4×8 MIMO-FIR filter) to jointly estimate transmitter and receiver IQ differential phase response (and hence estimate the transmitter and receiver IQ skew). The transmitter impairment does not affect estimation of the receiver skew, and vice versa.

The examples described herein enable the set of 4×8 equalizer coefficients to be used for estimation of IQ skew, as well as other channel skew (e.g., XY skew), thus enabling direct compensation of transmitter and receiver skew by the 4×8 MIMO equalizer. Because the channel skew can be directly estimated from the phase responses, the disclosed examples may be robust to optical polarization rotation, IQ phase error and IQ gain imbalance (e.g., the estimation of skew may not be affected by the presence of such impairments).

The examples described herein may be implemented for real-time equalization (e.g., on ASIC-DSP chip), to compensate for linear impairments, such as IQ crosstalk, IQ quadrature phase error, IQ gain imbalance and IQ skew. The examples described herein may also be implemented in calibration software for factory calibration, remote transmitter calibration, or in-service calibration of transmitter skew and receiver skew (including IQ skew, XY skew, and IQ differential phase responses).

The examples described herein can be implemented in a single stage 4×8 MIMO equalizer implemented in the DSP (instead of requiring two stages as in some other existing solutions), which may provide a faster and more efficient solution for calibration of IQ skew in a coherent transceiver. The ability to implement the disclosed examples in DSP (without requiring additional hardware components) may make implementation relatively simple and low cost.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus comprising a receiver having a processor configured to:
    receive a measured signal, the measured signal being a four-channel signal corresponding to in-phase (I) and quadrature (Q) channels for each of two orthogonal polarizations;
    estimate a carrier frequency offset between the measured signal and a reference signal;
    construct a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs;
    using MIMO output from the 4×8 MIMO equalizer, calculate a set of equalizer coefficients by minimizing error between the MIMO output and the reference signal;
    estimate receiver IQ skew and transmitter IQ skew using the equalizer coefficients, by converting the set of equalizer coefficients from a time domain to a frequency domain to determine receiver IQ differential phase response and transmitter IQ differential phase response in the frequency domain, the receiver and transmitter IQ differential phase response being indicative of respective receiver and transmitter IQ skew in the time domain; and
    perform skew compensation using the estimated receiver IQ skew and estimated transmitter IQ skew.

2. The apparatus of claim 1, wherein the set of equalizer coefficients is calculated using a least squares algorithm to minimize the error between the MIMO output and the reference signal.

3. The apparatus of claim 1, wherein the set of equalizer coefficients is calculated using an adaptive least mean square algorithm to minimize the error between the MIMO output and the reference signal.

4. The apparatus of claim 1, wherein the set of inputs is constructed by:
    multiplying the Q-channel signals of the four-channel signal by imaginary number j, to obtain imaginary-valued Q-channel signals;
    pointwise multiplying each of real-valued I-channel signals and the imaginary-valued Q-channel signals with a carrier frequency offset phasor generated using the estimated carrier frequency offset, to obtain the four complex inputs; and
    applying a conjugate operation to each of the four complex inputs to obtain the respective conjugate replicas.

5. The apparatus of claim 1, wherein the receiver IQ skew and the transmitter IQ skew are estimated by:
    converting the equalizer coefficients from the time domain to the frequency domain;
    determining the receiver IQ differential phase response and the transmitter IQ differential phase response for each polarization; and
    using a slope of the respective differential phase response as the estimated receiver IQ skew and the estimated transmitter IQ skew for each polarization.

6. The apparatus of claim 1, wherein the set of equalizer coefficients is further used to estimate receiver XY skew and transmitter XY skew, and wherein the estimated receiver XY skew and the estimated transmitter XY skew are further used to perform skew compensation.

7. The apparatus of claim 6, wherein the receiver XY skew and the transmitter XY skew are estimated by:
    converting the equalizer coefficients from the time domain to the frequency domain;
    determining the receiver XY phase difference and the transmitter XY phase difference; and
    using a slope of the respective phase difference as the estimated receiver XY skew and the estimated transmitter XY skew.

8. The apparatus of claim 1, wherein performing skew compensation comprises:
    transmitting the estimated transmitter IQ skew to another apparatus.

9. The apparatus of claim 1, wherein performing skew compensation comprises real-time equalization using the 4×8 MIMO equalizer.

10. A method, comprising:
    receiving a measured signal, the measured signal being a four-channel signal corresponding to in-phase (I) and quadrature (Q) channels for each of two orthogonal polarizations;
    estimating a carrier frequency offset between the measured signal and a reference signal;
    constructing a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs;

using MIMO output from the 4×8 MIMO equalizer, calculating a set of equalizer coefficients by minimizing error between the MIMO output and the reference signal;

estimating receiver IQ skew and transmitter IQ skew using the equalizer coefficients, by converting the set of equalizer coefficients from a time domain to a frequency domain to determine receiver IQ differential phase response and transmitter IQ differential phase response in the frequency domain, the receiver and transmitter IQ differential phase response being indicative of respective receiver and transmitter IQ skew in the time domain; and performing skew compensation using the estimated receiver IQ skew and estimated transmitter IQ skew.

11. The method of claim 10, wherein the set of equalizer coefficients is calculated using a least squares algorithm to minimize the error between the MIMO output and the reference signal.

12. The method of claim 10, wherein the set of equalizer coefficients is calculated using an adaptive least mean square algorithm to minimize the error between the MIMO output and the reference signal.

13. The method of claim 10, wherein the set of inputs is constructed by:

multiplying the Q-channel signals of the four-channel signal by imaginary number j, to obtain imaginary-valued Q-channel signals;

pointwise multiplying each of real-valued I-channel signals and the imaginary-valued Q-channel signals with a carrier frequency offset phasor generated using the estimated carrier frequency offset, to obtain the four complex inputs; and applying a conjugate operation to each of the four complex inputs to obtain the respective conjugate replicas.

14. The method of claim 10, wherein the receiver IQ skew and the transmitter IQ skew are estimated by:

converting the equalizer coefficients from the time domain to the frequency domain;

determining the receiver IQ differential phase response and the transmitter IQ differential phase response for each polarization; and using a slope of the respective differential phase response as the estimated receiver IQ skew and the estimated transmitter IQ skew for each polarization.

15. The method of claim 10, wherein the set of equalizer coefficients is further used to estimate receiver XY skew and transmitter XY skew, and wherein the estimated receiver XY skew and the estimated transmitter XY skew are further used to perform skew compensation.

16. The method of claim 15, wherein the receiver XY skew and the transmitter XY skew are estimated by:

converting the equalizer coefficients from the time domain to the frequency domain;

determining the receiver XY phase difference and the transmitter XY phase difference; and using a slope of the respective phase difference as the estimated receiver XY skew and the estimated transmitter XY skew.

17. The method of claim 10, wherein performing skew compensation comprises:

transmitting the estimated transmitter IQ skew to another apparatus.

18. The method of claim 10, wherein performing skew compensation comprises real-time equalization using the 4×8 MIMO equalizer.

19. A non-transitory computer-readable medium having instructions thereon, wherein the instructions, when executed by a processor of a receiver, cause the receiver to:

receive a measured signal, the measured signal being a four-channel signal corresponding to in-phase (I) and quadrature (Q) channels for each of two orthogonal polarizations;

estimate a carrier frequency offset between the measured signal and a reference signal;

construct a set of inputs for a 4×8 multiple-input multiple-output (MIMO) equalizer implemented by the receiver, the set of inputs being constructed by converting the four-channel signal into four complex inputs, the Q-channel signals of the four-channel signal being converted to imaginary inputs and each of the four complex inputs having a phase shift corresponding to the estimated carrier frequency offset, the set of inputs including the four complex inputs and further including respective conjugate replicas of the four complex inputs;

using MIMO output from the 4×8 MIMO equalizer, calculate a set of equalizer coefficients by minimizing error between the MIMO output and the reference signal;

estimate receiver IQ skew and transmitter IQ skew using the equalizer coefficients, by converting the set of equalizer coefficients from a time domain to a frequency domain to determine receiver IQ differential phase response and transmitter IQ differential phase response in the frequency domain, the receiver and transmitter IQ differential phase response being indicative of respective receiver and transmitter IQ skew in the time domain; and perform skew compensation using the estimated receiver IQ skew and estimated transmitter IQ skew.

* * * * *